R. S. MacEWAN.
HOSE COUPLING.
APPLICATION FILED APR. 9, 1908.
924,166.
Patented June 8, 1909.
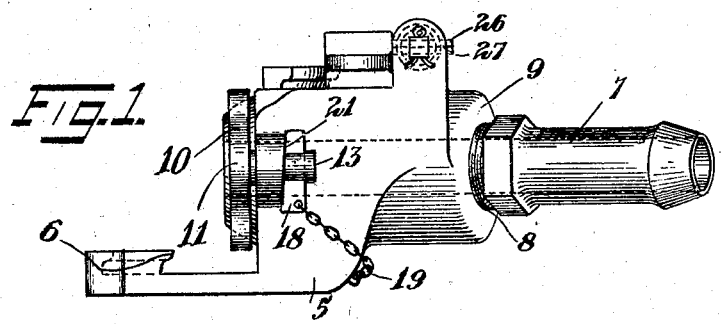
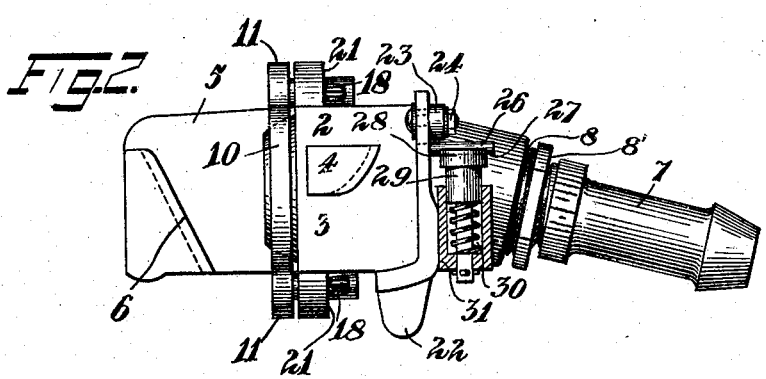
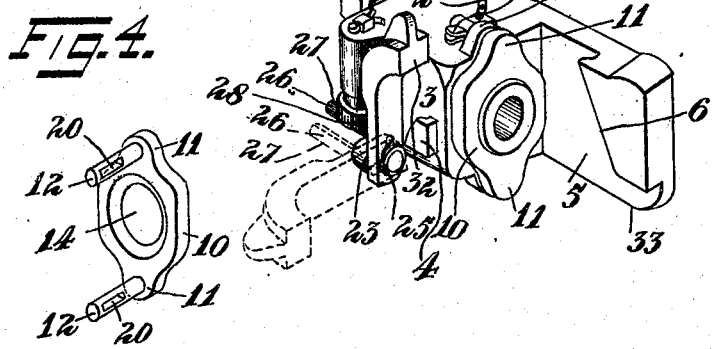
Witnesses:
Inventor:
Robert S. MacEwan
By his Attorney,

UNITED STATES PATENT OFFICE.

ROBERT S. MacEWAN, OF TROY, NEW YORK.

HOSE-COUPLING.

No. 924,166.      Specification of Letters Patent.      Patented June 8, 1909.

Application filed April 9, 1908. Serial No. 426,028.

*To all whom it may concern:*

Be it known that I, ROBERT S. MACEWAN, a citizen of the United States, residing in Troy, in the county of Rensselaer and State of New York, have invented certain new and useful Improvements in Hose-Couplings, of which the following is a specification.

This improvement relates to steam hose couplings particularly adapted for connecting the steam hose between cars, the object of the invention being to provide an improved coupling of this character so constructed and assembled that the couplings will readily pull apart on the breakage of the train without injury to either head of the coupling, but which hose couplings will, when the cars are properly coupled up, be efficiently coupled together.

A further object of the invention is the provision of improved means for holding the gasket in position, such means being so constructed that the gasket may be readily and quickly removed and yet effectively held in position, and will also enable such gasket to automatically seat itself to properly perform its work.

In the drawings accompanying and forming part of this specification, Figure 1 is a top view of one of the coupling heads and hose nipples; Fig. 2 is a side view thereof; Fig. 3 is a perspective view of one of these improved coupling heads, the locking latch also being illustrated in dotted lines; Fig. 4 is a perspective view of the gasket holder; and Fig. 5 is a sectional view of the gasket.

Similar characters of reference indicate corresponding parts throughout the different figures of the drawings.

In that form of steam hose coupling now generally in use the gasket is held in position by means of a hinged holder or plate, which is locked in position by a latch or cam, it being necessary, when it is desired to remove the gasket, to swing this holder open because the gasket has to be removed from the inner side of the swinging frame, and it is therefore difficult to remove it in practice because the frame has only a limited swinging movement. Moreover, in this particular form of coupling head it has been the practice to rabbet the gasket and the inner side of the holder, this, of course, requiring, as stated, the removal of the gasket from the inner side of the frame or holder when it is swung open, and when these parts do not properly fit or get caught, as sometimes happens, a steam-tight joint is not obtained. Moreover, the means for locking the duplicate coupling heads together comprises a horizontally swinging latch, and when the cars become separated prematurely the disconnection of the steam couplings has not been possible in the form of coupling referred to without breakage of the parts. By means of the present improvements, however, all of these disadvantages are done away with and the removal of the gasket obtained without the swinging open of the frame, while the gasket also automatically seats itself in its frame or carrier to always insure a steam-tight fitting of the parts, and should any of the cars of the train become prematurely uncoupled or break away the construction of the coupling is such that it will be automatically uncoupled without breakage of any of the parts.

In the preferred embodiment of the present improvement each coupling comprises a pair of duplicate members or heads, and therefore a description of one will suffice to give a clear understanding of this improved coupling. In a general way each of these heads may be made like the ordinary coupling head most generally in use, it comprising a body or main portion 2 having a flat side 3 provided with a locking lug 4 and having at its opposite side a forwardly extending wing 5 provided with a locking flange or rib 6, the flange of one coupler head interlocking with the lug of its companion coupler head in the usual well known manner. The head is also provided with means for the attachment of a hose nipple 7, which may be either formed as a part thereof or, as shown herein, as a separate member attached to such head in any suitable manner, whereby when the head becomes broken or injured the body thereof only need be replaced. In the form shown this nipple is screwed into a threaded opening 8, or, as shown in Fig. 2, into a threaded bushing 8' of the head and is inclined upward in the usual manner. The face 9 of the head carrying the steam passage or opening communicating with the nipple is shown as flat and is suitably formed to receive a gasket holder or frame, which, in the present instance, comprises a member 10 having a pair of ears or projections 11 each having a rearwardly extending pin 12 projecting into ears 13 carried at the top and bottom of the head. This gasket frame is provided with an opening 14 of the desired diameter to accommodate the proper size of gasket, and this opening is cupped. The gasket has a ball edge, whereby, as will be immediately apparent, the gasket will automatically seat itself when inserted into such opening.

Any suitable means may be used for holding the gasket frame in position on the face of the head, but in the present instance I have shown a pair of split keys 18, which may be suitably connected by chains 19 to the head. These keys fit into slots 20 formed in the pins or studs in the gasket frame or carrier and clamp such frame, and thereby the gasket, in position in an effective manner owing to the inclined formation, as at 21, of the rear walls of the ears carried by the head and with which inclined ears the tapered sides of the split keys engage. Of course, this same result could be obtained in any other suitable way, as by tapered bolts, which could be threaded bolts for the reception of nuts if desired. Moreover, the pins or studs might in some forms of the coupling be carried by the head, while the apertured ears be formed on the gasket frame.

By means of this improvement, on the removal of the split keys, it is merely necessary to draw the frame outward away from the face of the head, whereby the gasket may be readily removed and a new gasket inserted, thus dispensing with the hinge of the gasket frame and the provision of a pivoted locking cam or device for holding such frame in position.

I am aware that it has been attempted to dispense with the use of the hinged frame by securing the gasket in position by means of springs. By the present improvement, however, I am not only able to do away with the use of a hinged frame, but also with all springs for holding the gasket in position, thus very much simplifying the construction and also insuring that the gasket be properly clamped in position at all times against premature separation, since the attachment and detachment of the gasket carrier or frame is obtained by a sliding action of the carrier toward and from the head axially of the steam passage, and this permits the gasket carrier to be entirely attached to or detached from the head very readily.

As hereinbefore stated, in the ordinary form of steam coupler now used it has been the practice to provide a horizontally swinging latch for locking the two couplers together. This latch, however, prevents the couplers from automatically separating without the breakage of the parts. In the present instance I provide an improved locking device for securing the heads together, and which consists of a vertically swinging latch 22 pivoted to an ear 23 on the head by means of a bolt or pivot 24, the latch having vertical play relatively to its pivotal support by forming it with an elongated slot 25 to work on said pivot. This latch has a rearwardly extending stud or projection 26 provided with a tapered or knife-edge face 27 adapted to engage the grooved under face 28 of a spring held member or plunger 29 carried in an opening 30 of a projection 31 formed on the head. The upper end of the latch is provided with an overhanging portion 32 adapted to fit over the upper outer end 33 of the wing of the companion head when the same are interlocked in the manner hereinbefore described, the spring-acting detent or member holding the locking latch down in firm engagement with the top of such wing. Should, however, the cars become uncoupled or break away, the coupling heads will automatically separate from each other by reason of the fact that the locking latch will be forced upward against the action of its spring and thus permit the locking flanges and lugs to slide one from the other, and this without breakage of any of the parts. From the foregoing it will be seen that this improved locking latch is movable in two directions, it having a swinging movement into and out of locking position in a vertical plane and also a shiftable movement, the latter being an automatic one, in a vertical plane to permit the automatic uncoupling of the coupler heads, the spring actuated means preventing the latch from swinging while permitting the vertical play thereof.

This improved coupling it is to be understood may not only be used with steam hose for railroad service, but for other purposes, being as well adapted for service where air or other fluid is used. Moreover, by forming the gasket holder as cupped and the gasket with a ball edge it will be observed that the gasket will locate itself properly in its seat, and by coupling the nipple to the head by means of a nut or bushing as shown in Fig. 2, not only can the nipple be readily removed without the necessity of rotating the heavy head, but it obviates all chance of the parts crowding.

I claim as my invention:

1. A coupler head for steam hose couplings, having a locking latch connected thereto at one side thereof for swinging movement into an upright locking position at the side of the head or into an unlocking position outwardly away from the head.

2. A coupler head for steam hose couplings, having a locking latch connected at its lower end to one side of said head for swinging movement toward and from said head.

3. A coupler head for steam hose couplings, having a locking latch connected thereto at one side thereof for swinging movement in a vertical plane toward and from said head, said latch being also automatically shiftable in a vertical plane.

4. A coupler head for steam hose couplings, having a locking latch connected at its lower end to one side of said head for swinging movement toward and from said head, said latch having a slot thereby to permit the automatic shifting of said latch in a vertical plane.

5. A coupler head for steam hose couplings, having a locking latch provided with an elongated slot adjacent to its lower end and pivoted through the medium of said slot to said head for swinging movement toward and from such head, and spring controlled means for holding said latch in its locking position.

6. A coupler head for steam hose couplings, having a locking latch provided with an elongated slot adjacent to its lower end and pivoted through the medium of said slot to said head for swinging movement toward and from such head, and spring controlled means for holding said latch in its locking position, said means comprising a spring pressed plunger and a projecting member carried by said latch in engagement with said plunger.

7. A coupler head for steam hose couplings, having a locking latch provided with an elongated slot adjacent to its lower end and pivoted through the medium of said slot to said head for swinging movement toward and from such head, and spring controlled means for holding said latch in its locking position, said means comprising a spring pressed plunger carried by the head and a projecting member carried by said latch and having a knife edge adapted to be engaged by said plunger.

8. A coupler head for steam hose couplings, having a locking latch provided with an elongated slot adjacent to its lower end and pivotally connected through the medium of said slot to said head for swinging movement toward and from the head, said latch having at its upper or outer end an overhanging latching portion projecting toward the coupling face of the head, and spring controlled means at the rear of said latch for maintaining it in its locking position and for permitting the automatic shifting of the latch when in its locking position.

9. A coupler head for steam hose couplings, having at one side a wing provided with a locking flange and at its other side a locking lug, a locking latch pivoted in the rear of and below said lug for swinging movement toward and from the head, and spring controlled means for holding said latch in its locking position, said latch constructed to have vertical play when in its locking position under the control of said spring controlled means.

10. A coupler head for steam hose couplings, having a steam passage, a gasket carrier therefor having a cupped gasket seat, a gasket fitting said seat and having a ball-formed edge, wedging means for securing said carrier to the head and effective to permit the attachment and detachment of said carrier in a plane coincident with the axis of the passage, a locking latch pivotally connected to said head for swinging movement toward and from the head, said latch having an elongated slot, and spring controlled means for maintaining said latch in its locking position and effective to permit, through the medium of the slot, automatic lengthwise play of the latch.

ROBERT S. MacEWAN.

Witnesses:
H. G. HAMMETT,
JOHN A. LECKIE.